United States Patent
Jory et al.

(10) Patent No.: US 11,860,894 B2
(45) Date of Patent: Jan. 2, 2024

(54) DATABASE MANAGEMENT SYSTEM DATA REPLICATION

(71) Applicant: International Business Machines Corporation, Armonk, NY (US)

(72) Inventors: Michael Jory, North York (CA); Dirk Alexander Seelemann, II, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 17/001,664

(22) Filed: Aug. 24, 2020

(65) Prior Publication Data

US 2022/0058207 A1 Feb. 24, 2022

(51) Int. Cl.
G06F 16/27 (2019.01)
G06F 16/23 (2019.01)
G06F 16/28 (2019.01)
G06F 16/245 (2019.01)

(52) U.S. Cl.
CPC ........ G06F 16/273 (2019.01); G06F 16/2358 (2019.01); G06F 16/2379 (2019.01); G06F 16/245 (2019.01); G06F 16/284 (2019.01)

(58) Field of Classification Search
CPC ............... G06F 16/273; G06F 16/2358; G06F 16/2379; G06F 16/245; G06F 16/284
See application file for complete search history.

(56) References Cited

U.S. PATENT DOCUMENTS

| | | | |
|---|---|---|---|
| 7,051,051 B1 * | 5/2006 | Stegelmann | ........ G06F 11/1474 |
| 8,903,779 B1 | 12/2014 | Holenstein | |
| 9,417,890 B2 | 8/2016 | Reddish | |
| 10,216,820 B1 * | 2/2019 | Holenstein | .............. G06F 3/065 |
| 2005/0131966 A1 * | 6/2005 | Lou | ...................... G06F 16/2308 |
| 2005/0193024 A1 * | 9/2005 | Beyer | ..................... G06F 16/20 |
| 2007/0174315 A1 * | 7/2007 | Leff | ........................ G06F 16/27 |

(Continued)

FOREIGN PATENT DOCUMENTS

| | | |
|---|---|---|
| EP | 3410320 A1 | 12/2018 |
| WO | 2017023426 A1 | 2/2017 |

OTHER PUBLICATIONS

"The Transaction Log (SQL Server)," Microsoft Docs, Oct. 23, 2019, 10 pages. <https://docs.microsoft.com/en-us/sql/relational-databases/logs/the-transaction-log-sql-server?view=sql-server-ver15>.

Anonymous, "Method for verifying integrity of database replications," IP.com, Disclosure No. IPCOM000247521D, Sep. 14, 2016, 3 pages. <https://ip.com/IPCOM/000247521>.

(Continued)

*Primary Examiner* — Alicia M Willoughby
(74) *Attorney, Agent, or Firm* — Donald J. O'Brien

(57) ABSTRACT

In response to identifying an update operation for a system table of a DBMS, a row that corresponds to the update operation is identified using a partial image of the update operation. A before image that corresponds to the row is gathered and a new before image of the row that reflects the update operation is generated by overlaying the before image with the partial image. In response to identifying a delete operation that relates to the system table, a row of the system table that corresponds to the delete operation is identified using an identifier of the delete operation. A before image that corresponds to this row is gathered. A new before image of the row of the system table that reflects the delete operation is generated by applying the delete operation to this before image.

20 Claims, 3 Drawing Sheets

(56) References Cited

U.S. PATENT DOCUMENTS

| | | |
|---|---|---|
| 2008/0046480 A1 | 2/2008 | Lou |
| 2008/0249988 A1* | 10/2008 | Chaitanya ............. G06F 16/252 |
| 2010/0036803 A1* | 2/2010 | Vemuri ............ G06F 16/24565 |
| | | 707/E17.054 |
| 2012/0030172 A1* | 2/2012 | Pareek .................. G06F 16/275 |
| | | 707/635 |
| 2013/0006940 A1* | 1/2013 | Garza ................. G06F 16/2358 |
| | | 707/648 |
| 2014/0258234 A1* | 9/2014 | Michels ................ G06F 16/273 |
| | | 707/638 |
| 2017/0286475 A1* | 10/2017 | Cadarette ........... G06F 16/2365 |
| 2018/0136911 A1 | 5/2018 | Goja |
| 2019/0265971 A1 | 8/2019 | Behzadi |

OTHER PUBLICATIONS

Anonymous, "Method to Avoid Replication Delays for Large Update Queries," IP.com, Disclosure No. IPCOM000245749D, Apr. 4, 2016, 2 pages. <https://ip.com/IPCOM/000245749>.

Anonymous, "Push-Down of Data Change Detection in Relational Database Systems," IP.com, Disclosure No. IPCOM000176076D, Nov. 4, 2008, 4 pages. <https://priorart.ip.com/IPCOM/000176076>.

Goldsmith et al., "Technique for Data Recovery Excluding Portions of the Log without Requiring a Full Image Copy," IP.com, Disclosure No. IPCOM000106503D, Nov. 1, 1993, 3 pages. <https://priorart.ip.com/IPCOM/000106503>.

Majety, "Minimal Logging," SQL Server Central, Aug. 26, 2013, 8 pages. <https://www.sqlservercentral.com/articles/minimal-logging>.

* cited by examiner

DATABASE MANAGEMENT SYSTEM DATA REPLICATION

BACKGROUND

Modern databases are called to store an increasing amount of data and execute operations with increased performance, and do this with increased reliability. There are numerous types of different database management systems (DBMS) that define different structures within which data is stored and managed. One type of DBMS is a relational DBMS (RDBMS), which may be a database that stores data in table-like structures with columns and rows, such that the structure within the table defines how the data is related to each other (e.g., data values within a given row are all related, and data values within a given column are related to each other, etc.). Towards the above-mentioned end of increasing reliability and availability, many RDBMS use one or more replication mechanisms that enable the exact same current data to be stored at multiple sites or nodes. For example, environments that utilize RDBMS may include a roll-forward recovery log, which may include functionality that captures a series of operations (e.g., a specific set of atomic, consistent, independent, and durable (ACID) operations) that, when executed, effectively "roll forward" through time to replicate data. For example, such a roll-forward log may be created and maintained by identifying changes to the data in a "primary" table as it occurs and storing the operations behind these changes as imperative commands. Example imperative commands may include a start transaction command, an insert command, an update command, a delete command, a rollback transaction command, a commit transaction command, or the like.

SUMMARY

Aspects of the present disclosure relate to a method, system, and computer program product relating to enabling an RDBMS system to provide replication of application data tables without full logging of the system tables by generating before images of respective rows of the system tables from the roll-forward recovery log. For example, a computer-implemented method includes enabling replication of an application data table of a database management system (DBMS) by first identifying a delete operation as recorded in a roll-forward recovery log for the DBMS, wherein the delete operation relates to a system table that corresponds to the application data table. A row of the system table that corresponds to the delete operation may be identified using an identifier of the delete operation as stored within the roll-forward recovery log. A before image that corresponds to the row of the system table is gathered. A new before image of the row of the system table that reflects the delete operation may be generated by applying the delete operation to the before image.

Further aspects of the disclosure relate to a system that includes a processor and a memory in communication with the processor, the memory containing instructions that, when executed by the processor, cause the processor to enable replication of an application data table of a database management system (DBMS). The processor enables replication by first identifying a update operation as recorded in a roll-forward recovery log for the DBMS, wherein the update operation relates to a system table that corresponds to the application data table. A row of the system table that corresponds to the update operation is identified using a partial image of the update operation as stored within the roll-forward recovery log. A before image that corresponds to the row of the system table is gathered. A new before image of the row of the system table that reflects the update operation is generated by the system by overlaying the before image with the partial image.

Further aspects of the disclosure relate to a computer program product that includes a computer readable storage medium having program instructions embodied therewith, the program instructions executable by a computer to cause the computer to enable replication of an application data table of a database management system (DBMS). The computer program product enables replication by identifying a update operation as recorded in a roll-forward recovery log for the DBMS, wherein the update operation relates to a system table that corresponds to the application data table. A first row of the system table that corresponds to the update operation is identified using a partial image of the update operation as stored within the roll-forward recovery log. A first before image that corresponds to the first row of the system table is gathered. A first new before image of the first row of the system table that reflects the update operation is generated by overlaying the first before image with the partial image. The computer program product also enables replication by identifying a delete operation as recorded in a roll-forward recovery log, wherein the delete operation relates to the system table. A second row of the system table that corresponds to the delete operation is identified using an identifier of the delete operation as stored within the roll-forward recovery log. A second before image that corresponds to the second row of the system table is gathered. A second new before image of the second row of the system table that reflects the delete operation is generated by the computer program product by applying the delete operation to the second before image The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
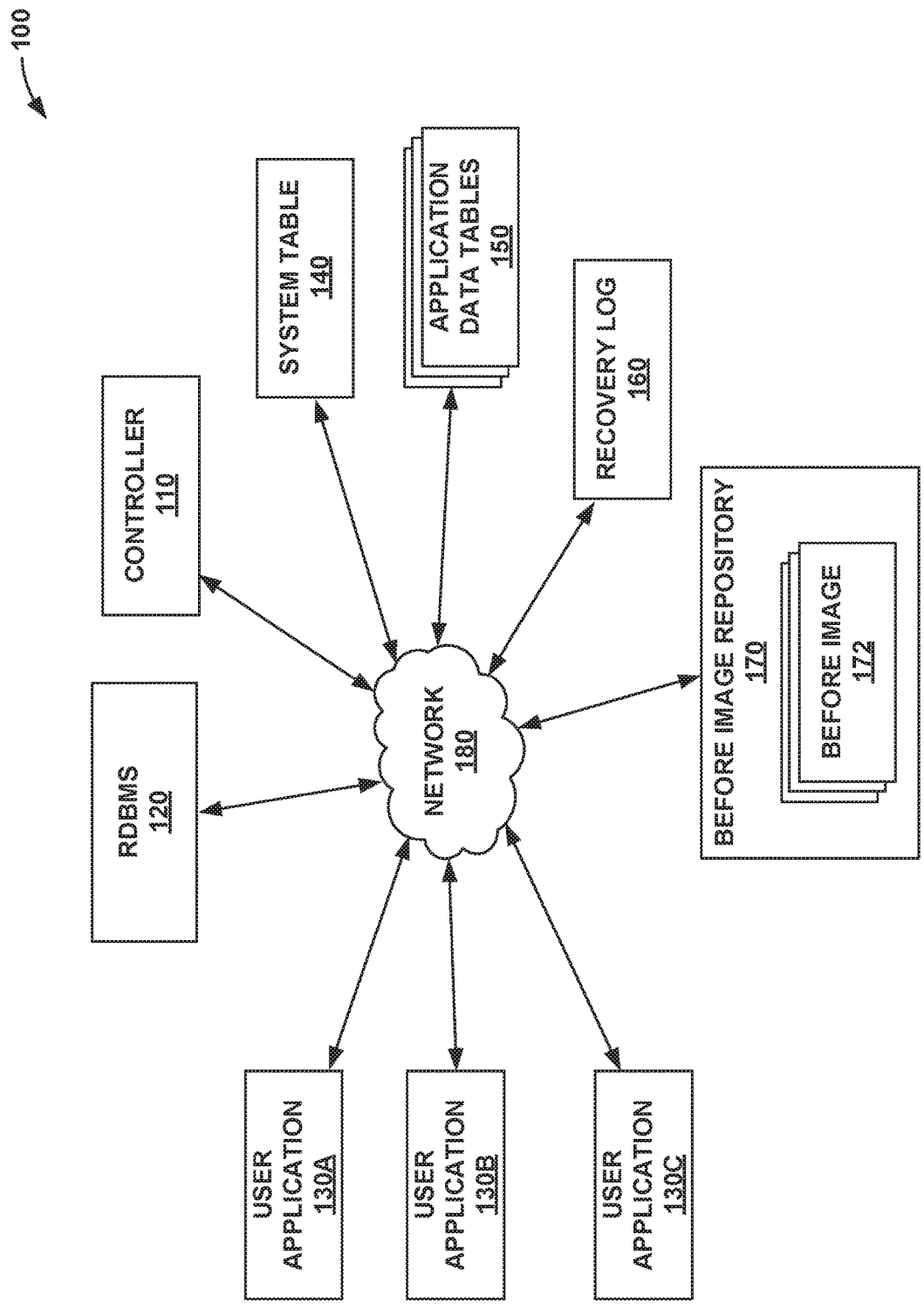
FIG. 1 depicts a conceptual diagram of an example system in which a controller enables replication of changes to application table data by generating before images of respective system tables without full logging.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to providing data replication, while more particular aspects of the present disclosure relate to detecting and then replicating changes to application data tables using a default level of logging for system tables that does not include continuous capturing of before and after images of system tables. While the present disclosure is not necessarily limited to such applications, various aspects of the disclosure may be appreciated through a discussion of various examples using this context.

There are many type of database management systems (DBMS) that a computing environment uses to store and organize data, such as data for/of an application. For example, one common type of DBMS is a relational DBMS (RDBMS), which stores data in tables or the like with rows and columns. In an RDBMS, the structure of the data within the tables (i.e., the location of each data point in relation to the rest of the data) provides meaning (i.e., metadata) for the data within the tables (e.g., such that data of a single row is related according to a variable, and data of a single column is related according to a different variable). As would be understood by one of ordinary skill in the art, within an RDBMS there may be data as generated or modified by a user for an application as stored in application data tables, and the application data tables may be supported by system tables that may relate to one or more application data tables. As discussed herein, changes to the application data tables as described herein may include some or all data manipulation language (DML) changes, and changes to the system table may include some or all data definition language (DDL) changes.

Modern computing environments may provide mechanisms for providing data replication, such that data of the database (e.g., data of the system tables and application data tables) is stored at more than one location (e.g., at more than one node, disk, site, etc.). For example, a conventional environment may utilize a roll-forward recovery log to provide data replication. Though one of ordinary skill in the art would understand aspects of this disclosure to relate to any database environment that utilizes a roll-forward recovery log for data replication, environments that utilize RDBMS are primarily discussed herein for purposes of clarity.

To provide the initializing points for each operation of a roll-forward recovery log, a mechanism of the conventional environment may allow elements of the conventional environment (e.g., where an element of the conventional environment includes an application) to request "full logging" of the system tables rather than a "default" amount of logging that an RDBMS (e.g., where the default amount of logging requires less logging than full logging, and wherein the default logging includes the amount of logging that an RDBMS executes unless specified otherwise). A default amount of logging for tables may not include capturing and/or storing the before image of an update operation, capturing and/or storing an image for a delete operation, and may only include capturing and/or storing a partial after image for an update operation. With this default amount of logging, it may be difficult or impossible for a conventional system to provide reliable and robust data replication using a roll-forward recovery log.

Conversely, full logging as described herein and executed by conventional database environments to provide data replication includes capturing and storing system table row states before and/or after a respective change, these states referred to as a "before image" and an "after image" of the respective row. Using these before images and after images as gained from full logging, a conventional replication system is configured to determine which column values changed. Upon identifying the exact row and column, a conventional replication system uses the command from the roll-forward recovery log to recreate the respective values at the second (or third, or fourth, etc.) replication site. In this way, changes to system table data may be replicated immediately upon detecting an update to the original. In many conventional systems, this process of full logging is functionally continuous, such that before images and after images must be automatically and consistently captured as part of the replication process after every single operation. However, storing each of these images with full logging may decrease operational performance and/or increase disk utilization of a respective conventional RDBMS. Such decreased performance and/or increased disk utilization may be especially impactful for time-critical system table changes. Further, problems that result from this constant full-logging may be expensive and time-consuming to fix. Additionally, if a replication of an application data table is requested without full logging of a system table, accounting for any such DDL change without logging requires extensive and error-prone manual intervention and correction by human database administrators.

Aspects of this disclosure may solve or otherwise address some or all of these problems. For example, aspects of the disclosure may eliminate the need for full logging of all changes to the system tables of the RDBMS (e.g., where changes to the system tables include any DDL changes), instead enabling a computing environment to replicate all changes to application data tables for one or more applications from default logging of system tables and application data tables of an RDBMS environment. One or more computing components (these computing components including or otherwise making using of a processing unit executing instructions stored on a memory) may provide this functionality, these one or more computing components hereinafter referred to collectively as a controller. This controller may be integrated into one or more components of a computing environment that utilizes an RDBMS and a roll-forward recovery log to provide this functionality.

Further, as will be understood by one of ordinary skill in the art, aspects of this disclosure may be able to replicate changes to default values and/or constraints of the RDBMS using substantially only the default logging of system tables as described herein. Though replicating changes to the application tables is predominantly discussed throughout for purposes of illustration, it is to be understood that the techniques described herein are also largely applicable to replicating these changes to the default values and/or constraints, such that these changes to default values and/or constraints may be replicated without full logging of the system tables.

For example, FIG. 1 depicts environment 100 in which controller 110 works with RDBMS 120 to replicate system data from one or more system tables 140 in order to subsequently replicate application data from one or more application data tables 150. RDBMS 120 may be used to manage (e.g., create, retrieve, update, or delete) data as requested by user applications 130A, 130B, 130C (collectively "user applications 130"). Commands to thusly generate/modify/delete/etc. data as sent from user applications 130 may be reflected in roll-forward recovery log 160. There may be any number of system tables 140, application data tables 150, and/or roll-forward recovery logs 160 for any number of different user applications 130 (e.g., whether different instances of a single user application 130 and/or different user applications entirely) as are supported by environment 100.

Controller 110, RDBMS 120, user applications 130, system tables 140, application data tables 150, roll-forward recovery log 160, and before image repository 170 may communicate over network 180. Network 180 may include a computing network over which computing messages may be sent and/or received. For example, network 180 may include the Internet, a local area network (LAN), a wide area network (WAN), a wireless network such as a wireless LAN (WLAN), or the like. Network 180 may comprise copper transmission cables, optical transmission fibers, wireless transmission, routers, firewalls, switches, gateway computers and/or edge servers. A network adapter card or network interface in each computing/processing device (e.g., controller 110, RDBMS 120, etc.) may receive messages and/or instructions from and/or through network 180 and forward the messages and/or instructions for storage or execution or the like to a respective memory or processor of the respective computing/processing device. Though network 180 is depicted as a single entity in FIG. 1 for purposes of illustration, in other examples network 180 may include a plurality of private and/or public networks over which controller 110 may detect changes to application data tables using only default logging as described herein. For example, user applications 130 and RDBMS 120 may communicate together over a first part of network 180, and RDBMS 120, controller 110, system tables 140, application tables 150, and roll-forward recovery logs 160 communicate together over a second part of network 180, while controller 110, roll-forward recovery logs 160, and before image repository 170 communicate together over a third part of network, etc.

Though each of controller 110, system table 140, application data tables 150, recovery log, and RDBMS 120 are depicted as discrete entities for purposes of illustration, one of ordinary skill in the art would understand that in other examples components of environment 100 may be organized differently and be consistent with aspects of the disclosure. For example, one or all of system table 140, roll-forward recovery log 160, and application data tables 150 may be stored on a single computing device, or the like. Where controller 110 is a standalone computing device, controller 110 may be similar to computing system 200 of FIG. 2 that includes a processor communicatively coupled to a memory that includes instructions that, when executed by the processor, cause controller 110 to execute one or more operations described below. Similarly, in other examples the computing device of RDBMS 120 (which may be a computing device similar to computing system 200) may include a first version of system table 140 and/or application tables 150 for user applications 130 (e.g., while recovery log 160 is still stored on a separate standalone computing device).

Controller 110 may determine a before image of the respective system table 140 entries that relate to the respective application data tables 150 for one or more respective user application 130. For example, controller 110 may detect a request from user application 130A for data replication, in response to which controller 110 may determine the before image of rows and columns of system table 140 that correspond to the respective application data table 150 for user application 130A. Controller 110 may determine this before image without direct access (e.g., where not having direct access includes controller 110 being physically remote from the database that stores application data table 150 and controller 110 does not have write access to application data table 150) to system table 140, RDBMS 120, and/or application data table 150 data files. For example, controller 110 may query system table 140 for entries related to respective application data tables 150 on which table structure change detection is desired. Such a query may essentially request data of all of the field values for each entry of system table 140 for each application data table 150 being replicated. Controller 110 may query system table 140 using structured query language (SQL) or the like.

Controller 110 may use code generation as understood by one of ordinary skill in the art to encode the values from system table 140 returned from the query into one or more before images 172 that reflect each respective entry (e.g., data points of indicated rows and columns of system table 140), and may store the generated before image 172 in before image repository 170. For example, controller 110 may generate (using code generation) before image 172 such that what is generated is substantially similar to a before image that would have been captured as part of full logging of system table 140 for a conventional RDBMS replication system. Controller 110 may generate and store each before image 172 such that each before image 172 indicates a corresponding point within roll-forward recovery log 160 at which before image 172 was generated (e.g., and therein a point at which before image 172 was accurate at that point in roll-forward recovery log 160). In some examples, controller 110 may generate a respective before image 172 for each row of system table 140 that relates to the respective application data table 150.

Controller 110 may query system table 140 and use code generation to generate one or more before images 172 at a rate that is far less than the continuous rate of logging that is utilized by conventional RDBMS replication systems. For example, controller 110 may only query system table 140 once at an initial startup. If at any point controller 110 detects a potential lapse in the data replication process, controller 110 may fully reinitialize the replication system in much the same way as an initial startup (e.g., such that controller 110 may query the relevant tables using SQL). Controller 110 may store all values gathered and generated from this query at a location external to RDBMS 120.

Once this before image is generated, controller 110 may identify any updates and/or deletes to system table 140. For example, controller 110 may crawl through roll-forward recovery log 160 to identify updates and/or deletes to system table 140. Once identified, controller 110 may update the stored before image 172 to reflect this update and/or delete to system table 140.

For example, being as deletes to system table 140 as stored in roll-forward recovery log 160 may only include an identifier and no row image, controller 110 may use this identifier to determine which code generated row image the delete applies to. Once controller 110 determines the respective row, controller 110 may gather before image 172 that corresponds to this row from before image repository 170. Once the respective before image 172 is gathered, controller 110 may use code generation to apply the delete operation to before image 172 to generate a new before image 172, saving this new before image 172 into before image repository 170. Controller 110 may further identify the point within roll-forward recovery log 160 that this newly generated before image 172 applies to, and store the new before image 172 to correlate to this point.

Similarly, for a detected update operation to system table 140, controller 110 may find the identifier from the partial image stored within the update in the roll-forward recovery log 160. This partial image may be logged by RDBMS 120 as part of the default logging as described above. Once controller 110 has this identifier, controller 110 may use it to identify the respective before image 172 that corresponds to this respective row of the, and overlay the logged partial after image on the respective previously generated before image 172. Controller 110 may use code generation to turn this overlaid image into a new before image 172 for system table 140, again saving the respective point in the roll-forward recovery log 160 that it corresponds to. In this way, controller 110 may maintain a complete and accurate history of system table 140 entries without requiring the full logging of system table 140.

Figure 2:
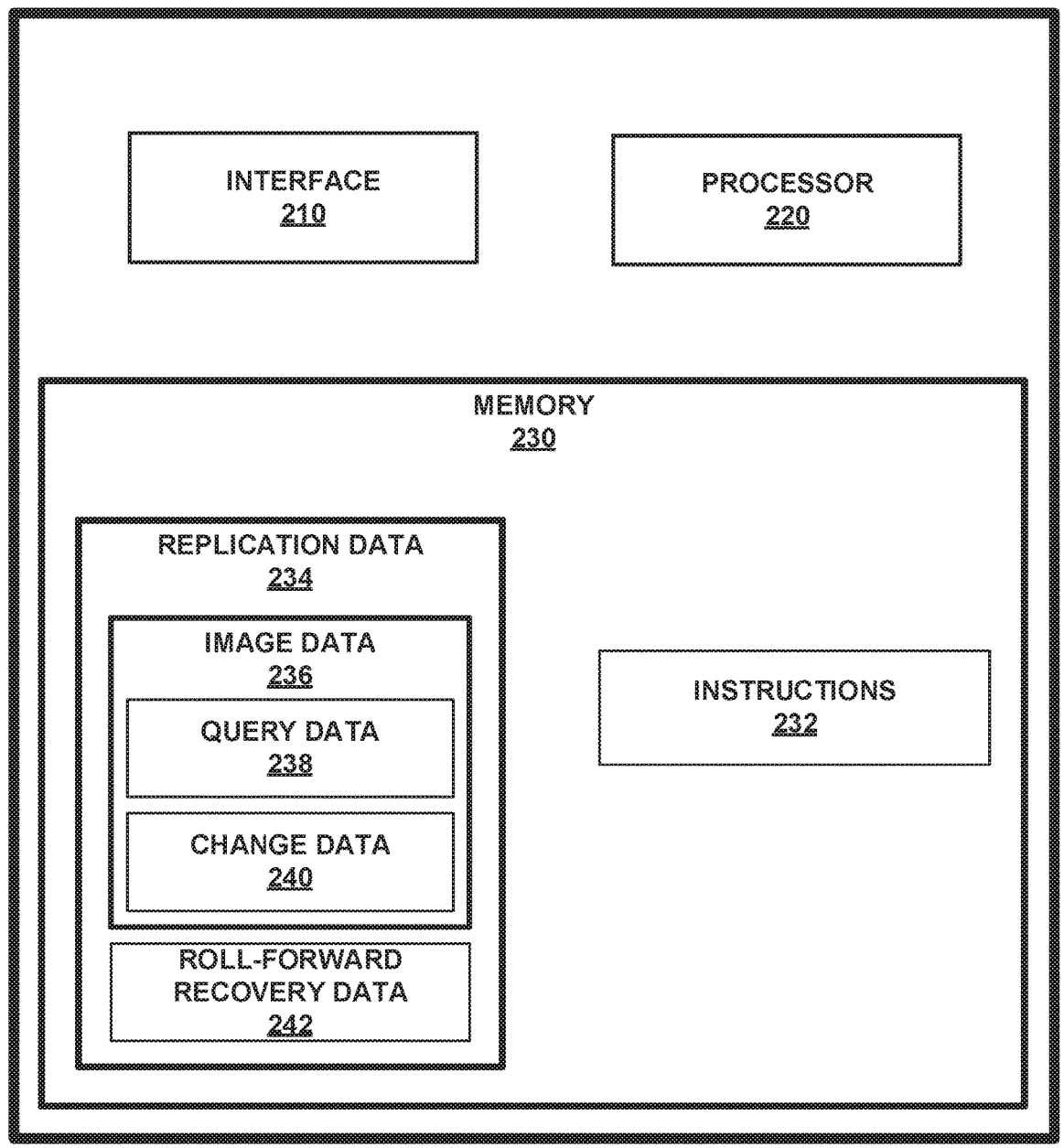
FIG. 2 depicts a conceptual box diagram of example components of the controller of FIG. 1.

As described above, controller 110 may include or be part of a computing system that includes a processor configured to execute instructions stored on a memory to execute the techniques described herein. FIG. 2 is a conceptual box diagram of such computing system 200. While computing system 200 is depicted as a single entity (e.g., within a single housing) for the purposes of illustration, in other examples, controller 110 may comprise two or more discrete physical systems (e.g., within two or more discrete housings). Computing system 200 may include interface 210, processor 220, and memory 230. Computing system 200 may include any number or amount of interface(s) 210, processor(s) 220, and/or memory(s) 230.

Computing system 200 may include components that enable controller 110 to communicate with (e.g., send data to and receive and utilize data transmitted by) devices that are external to controller 110. For example, computing system 200 may include interface 210 that is configured to enable controller 110 and components within computing system 200 (e.g., such as processor 220) to communicate with entities external to computing system 200. Specifically, interface 210 may be configured to enable controller 110 to communicate with RDBMS 120, system table 140, application data table 150, roll-forward recovery log 160, before image repository 170, or the like. Interface 210 may include one or more network interface cards, such as Ethernet cards and/or any other types of interface devices that can send and receive information. Any suitable number of interfaces may be used to perform the described functions according to particular needs.

As discussed herein, controller 110 may be configured to cause computing device 110 to generate before images 172 of system table 140 without full logging. Controller 110 may utilize processor 220 to thusly generate these before images. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to manage functionality.

Processor 220 may generate images of system table 140 according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may enable application data table 150 replication by generate before images of system table 140 without full logging as described herein according to instructions 232 of one or more applications (e.g., software applications) stored in memory 230 of computing system 200.

In addition to instructions 232, in some examples gathered or predetermined data or techniques or the like as used by processor 220 to generate before images of system table 140 may be stored within memory 230. For example, memory 230 may include information described above as described from system table 140, application data table 150, roll-forward recovery log 160, and/or before image repository 170. For example, controller 110 may be the primary location of before image repository 170, and/or controller 110 may store local copies of data from system table 140, application data table 150, or roll-forward recovery log 160.

For example, controller 110 may store replication data 234 with which application data table 150 may be replicated. Replication data 234 may include image data 236, which may include before images 172 that were generated by controller 110 as described herein. Image data 236 may also include respective points in roll-forward recovery, which may be stored in roll-forward recovery data 242.

Replication data 234 may also include query data 238, which may be the results that were returned by querying system table 140 to generate an initial before image 172. Replication data 234 may also include change data 240 that indicates updates and/or deletes or the like to system table 140 with which controller 110 generated new before images. In some examples, controller 110 may discard query data 238 and change data 240 upon generating the respective before image 172, though in other examples controller 110 may keep query data 238, change data 240, and/or all before images 172 so that a record of application data table 150 information over time may be tracked.

Figure 3:
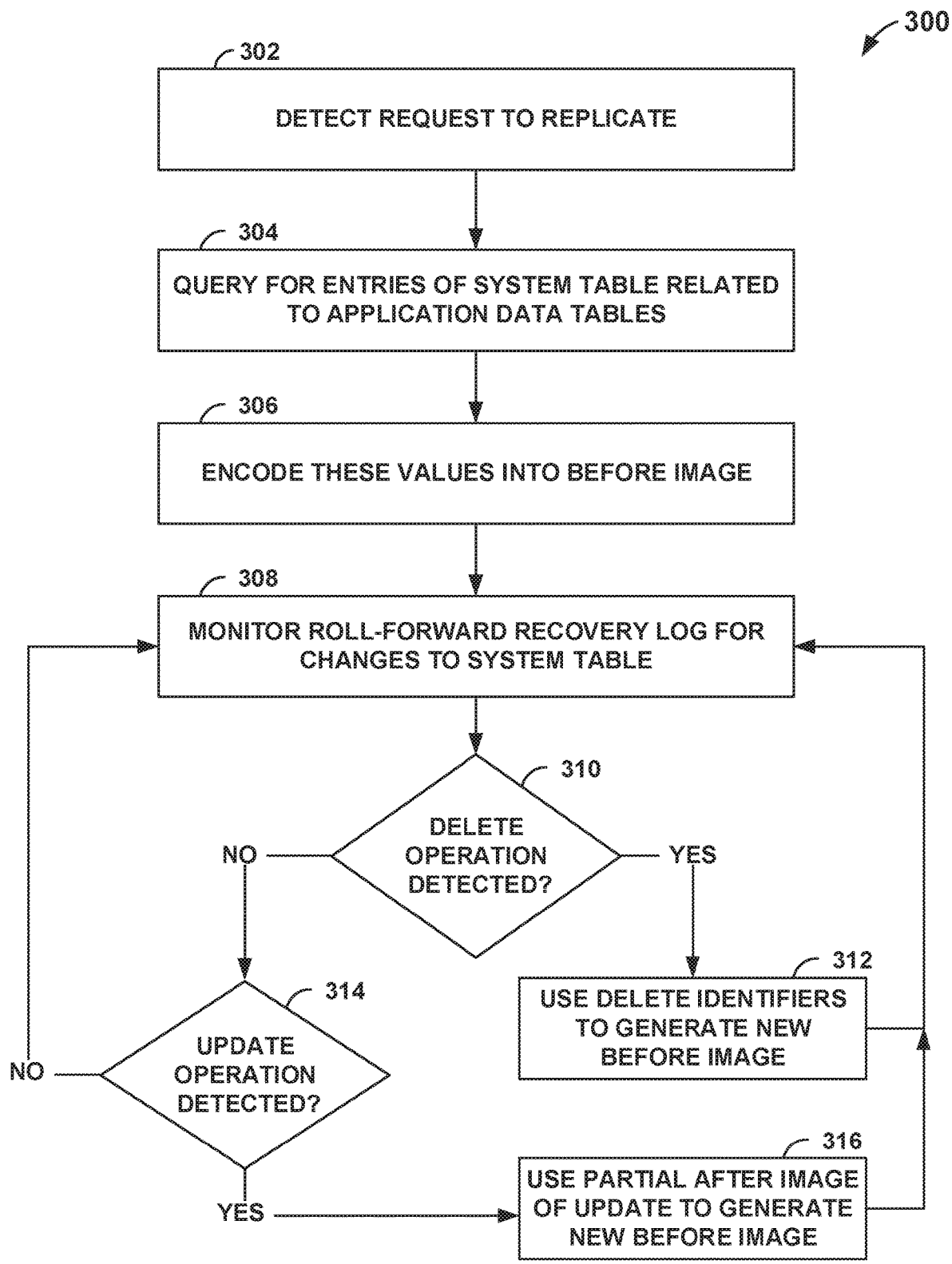
FIG. 3 depicts an example flowchart by which the controller of FIG. 1 may enable replication of changes to application table data by generating before images of respective system tables without full logging of the system table.

Using these components, controller 110 may enable replicating application data table 150 information via generating before images of system tables 140 without full logging. For example, controller 110 may provide this functionality according to flowchart 300 depicted in FIG. 3. Flowchart 300 of FIG. 3 is discussed with relation to FIG. 1 for purposes of illustration, though it is to be understood that other systems may be used to execute flowchart 300 of FIG. 3 in other examples. Further, in some examples controller 110 may execute a different method than flowchart 300 of FIG. 3, or controller 110 may execute a similar method with more or less steps in a different order, or the like.

Controller 110 may detect a request to replicate data of application data tables 150 (302). Controller 110 may receive this request from one or more user applications 130. In response to this request, controller 110 may send a query to system table 140 (304). This query may be an SQL query. Controller 110 may send this query to only those portions of system table 140 that relate to the respective application data tables 150. Controller 110 may structure the query to return values of system table 140 that relate to application data tables 150. Further, as will be understood by one of ordinary skill in the art, in some examples controller 110 may additionally or alternatively structure the query to gather default values and/or constraints of RDBMS 120.

Controller 110 may use the result from the query to generate before image 172 of system table 140 (306). Controller 110 may use code generation to generate before image 172. Controller 110 may store before image 172 in a location that is external to RDBMS 120, such as in before image repository 170. Controller 110 may generate one or more before images 172 to include application data table 150 values. Alternatively, or additionally, controller 110 may generate one or more before images 172 to include default values and/or constraints of RDBMS 120.

Controller 110 may monitor for changes to system table 140 (308). For example, controller 110 may crawl through or scrape roll-forward recovery log 160 for data that indicates changes to system table 140. Controller 110 may monitor for whether or not delete operations that relate to system table 140 entity values are detected (310).

If controller 110 detects a delete operation, controller 110 may generate a new before image 172 for system table 140 that reflects this delete operation. For example, controller 110 may find an identifier of the delete operation. Using this delete operation, controller 110 may identify a row of system table 140 that the delete operation corresponds to. Once this row is identified, controller 110 may use code generation to generate a new before image that reflects this delete operation. Controller 110 may further correlate this new before image with a point in roll-forward recovery log 160 at which point this before image is current and accurate.

If controller 110 determines that the changes to system table 140 are not a delete operation, controller 110 may determine whether or not the changes to system table 140 are an update operation (314). If no update operation is detected, controller 110 continues monitoring (308). If controller 110 does detect an update operation, controller 110 may gather the partial after image from the default logging on the update operation. Using this partial after image controller 110 identifies an identifier of the update, from which controller 110 further identifies a row of system table 140 to which the update relates to. Once controller 110 identifies this row using the partial after image, controller 110 uses code generation to generate a new before image 172 (316). Controller 110 may generate this before image by overlaying the partial after image over the before image that controller 110 previously generated for the identified row. As with the delete operation, controller 110 may further correlate this new before image with a point in roll-forward recovery log 160 at which point this before image is current and accurate.

As depicted, controller 110 may continue with this pseudo-continuous cycle of monitoring for system table 140 changes in order to replicate application data table 150 changes (and/or default values and constraints) in a loop 308-316. This loop may enable controller 110 to provide this data replication without full logging of system tables 140.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    enabling replication of an application data table of a database management system (DBMS) via a default amount of logging of a system table that corresponds to the application data table of the DBMS, wherein the default amount of logging includes a partial after image for update operations and does not include before images for delete operations, by:
        identifying a delete operation as recorded in a roll-forward recovery log for the DBMS, wherein the delete operation relates to the system table that corresponds to the application data table;
        identifying, using an identifier of the delete operation as stored within the roll-forward recovery log, a row of the system table that corresponds to the application data table, wherein the row is associated with the delete operation;
        querying entries of the system table that correspond to the application data table; and
        generating, by encoding values of the entries, a new before image of the system table that corresponds to the application data table, wherein the new before image reflects the application data table before the delete operation.

2. The computer-implemented method of claim 1, wherein the row is a first row and the enabling replication of the application data table of the DBMS further comprises:
    identifying an update operation as recorded in the roll-forward recovery log, wherein the update operation relates to the system table;
    identifying, using a partial image of the update operation as stored within the roll-forward recovery log, a second row of the system table that corresponds to the update operation;
    querying additional entries of system table related to the application data table; and
    generating, by encoding additional values of the additional entries, a new before image of the second row of the system table that reflects the application data table before the update operation.

3. The computer-implemented method of claim 1, wherein the new before image of the row of the system table is stored and linked to a point in the roll-forward recovery log that corresponds to the delete operation.

4. The computer-implemented method of claim 1, further comprising generating the before image of the system table using code generation.

5. The computer-implemented method of claim 4, wherein the before image is generated without accessing an image of the system table.

6. The computer-implemented method of claim 1, wherein the system table is queried using structured query language (SQL).

7. The computer-implemented method of claim 1, wherein the database utilizes a relational database management system (RDBMS).

8. The computer-implemented method of claim 1, wherein the new before image of the row of the system table is stored at a location external to the DBMS.

9. The computer-implemented method of claim 1, wherein the enabling replication of the application data table does not require full logging of the system table.

10. A system comprising:
    a processor; and
    a memory in communication with the processor, the memory containing instructions that, when executed by the processor, cause the processor to enable replication of an application data table of a database management system (DBMS) via a default amount of logging of a system table that corresponds to the application data table of the DBMS, wherein the default amount of logging includes a partial after image for update operations and does not include before images for delete operations, by:
        identifying a delete operation as recorded in a roll-forward recovery log for the DBMS, wherein the delete operation relates to the system table that corresponds to the application data table;
        identifying, using an identifier of the delete operation as stored within the roll-forward recovery log, a row of the system table that corresponds to the application data table, wherein the row is associated with the delete operation;

querying entries of the system table that correspond to the application data table; and generating, by encoding values of the entries, a new before image of the system table that corresponds to the application data table, wherein the new before image reflects the application data table before the delete operation.

11. The system of claim 10, wherein the row is a first row and the memory containing additional instructions that, when executed by the processor, cause the processor to enable replication of the application data table of the DBMS by:

identifying the delete operation as recorded in the roll-forward recovery log, wherein the delete operation relates to the system table;

identifying, using the identifier of the delete operation as stored within the roll-forward recovery log, a second row of the system table that corresponds to the delete operation;

querying additional entries of system table related to the application data table; and generating, by encoding additional values of the additional entries, a new before image of the second row of the system table that reflects the application data table before the delete operation.

12. The system of claim 10, wherein the new before image of the row of the system table is stored and linked to a point in the roll-forward recovery log that corresponds to an update operation.

13. The system of claim 10, the memory containing additional instructions that, when executed by the processor, cause the processor to generate the before image of the system table using code generation.

14. The system of claim 13, wherein the before image is generated without accessing an image of the system table.

15. The system of claim 10, wherein the enabling replication of the application data table does not require full logging of the system table.

16. The system of claim 10, wherein the DBMS is an relational DBMS (RDBMS).

17. A computer program product, the computer program product comprising a computer readable storage medium having program instructions embodied therewith, the program instructions executable by a computer to cause the computer to:

enable replication of an application data table of a database management system (DBMS) via a default amount of logging of a system table that corresponds to the application data table of the DBMS, wherein the default amount of logging includes a partial after image for update operations and does not include before images for delete operations, by:

identifying an update operation as recorded in a roll-forward recovery log for the DBMS, wherein the update operation relates to the system table that corresponds to the application data table;

identifying, using a partial image of the update operation as stored within the roll-forward recovery log, a first row of the system table that corresponds to the application data table, and wherein the first row is associated with the update operation;

querying first entries of system table related to the application data table;

generating, by encoding values of the first entries, a first new before image of the first row of the system table that corresponds to the application data table, wherein the first new before image of the first row reflects the application data table before the update operation;

identifying a delete operation as recorded in the roll-forward recovery log, wherein the delete operation relates to the system table that corresponds to the application data table;

identifying, using an identifier of the delete operation as stored within the roll-forward recovery log, a second row of the system table that corresponds to the application data table, wherein the second row is associated with the delete operation;

querying second entries of the system table that correspond to the application data table; and generating, by encoding values of the second entries, a second new before image of the system table that corresponds to the application data table, wherein the second new before image reflects the application data table before the delete operation.

18. The computer program product of claim 17, wherein both the first and second new before images are stored and linked to respective points in the roll-forward recovery log that corresponds to the update operation and the delete operation.

19. The computer program product of claim 17, the computer readable storage medium having additional instructions that, when executed by the computer, cause the computer to generate the first and second new before images of the system table using code generation.

20. The computer program product of claim 17, wherein the enabling replication of the application data table does not require full logging of the system table.

* * * * *